United States Patent
Brock et al.

(10) Patent No.: US 6,421,775 B1
(45) Date of Patent: Jul. 16, 2002

(54) INTERCONNECTED PROCESSING NODES CONFIGURABLE AS AT LEAST ONE NON-UNIFORM MEMORY ACCESS (NUMA) DATA PROCESSING SYSTEM

(75) Inventors: Bishop Chapman Brock; David Brian Glasco; James Lyle Peterson; Ramakrishnan Rajamony; Ronald Lynn Rockhold, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,301

(22) Filed: Jun. 17, 1999

(51) Int. Cl.[7] ............... G06F 15/177; G06F 9/00; G06F 9/24; G06F 15/00
(52) U.S. Cl. ............... 713/1; 713/2; 712/28; 709/100
(58) Field of Search ............ 713/1, 2; 712/28; 711/120, 143, 148, 153; 709/100

(56) References Cited

U.S. PATENT DOCUMENTS

| | | | | |
|---|---|---|---|---|
| 4,925,311 A | * | 5/1990 | Neches et al. | 709/100 |
| 5,561,768 A | * | 10/1996 | Smith | 712/13 |
| 5,710,907 A | * | 1/1998 | Hagersten et al. | 711/148 |
| 5,867,702 A | * | 2/1999 | Lee | 713/1 |
| 5,887,146 A | | 3/1999 | Baxter et al. | |
| 5,926,829 A | * | 7/1999 | Hagersten et al. | 711/120 |
| 5,938,765 A | * | 8/1999 | Dove et al. | 713/1 |
| 6,108,764 A | * | 8/2000 | Baumgartner et al. | 712/28 |
| 6,148,361 A | * | 11/2000 | Carpenter et al. | 710/260 |
| 6,243,794 B1 | * | 6/2001 | Casamatta | 711/153 |
| 6,247,109 B1 | * | 6/2001 | Kleinsorge et al. | 712/13 |
| 6,275,907 B1 | * | 8/2001 | Baumgartner et al. | 711/143 |
| 6,347,372 B1 | * | 2/2002 | Takashima et al. | 713/2 |

FOREIGN PATENT DOCUMENTS

| | | |
|---|---|---|
| EP | 0780769 A1 | 6/1997 |
| EP | 0817076 A1 | 1/1998 |

OTHER PUBLICATIONS

David Parry, *Scalability in Computing for Today and Tomorrow*, ARVLSI 1997.
RD 416099, Derwent Abstract for Research Disclosure, Dec. 1998.
Australian Patent Office Written Opinion, Dec. 5, 2001.

* cited by examiner

*Primary Examiner*—Jeffrey Gaffin
*Assistant Examiner*—Chu Cao
(74) *Attorney, Agent, or Firm*—Casimer K. Salys; Bracewell & Patterson, L.L.P.

(57) ABSTRACT

A data processing system includes a plurality of processing nodes that each contain at least one processor and data storage. The plurality of processing nodes are coupled together by a system interconnect. The data processing system further includes a configuration utility residing in data storage within at least one of the plurality of processing nodes. The configuration utility selectively configures the plurality of processing nodes into either a single non-uniform memory access (NUMA) system or into multiple independent data processing systems through communication via the system interconnect.

19 Claims, 5 Drawing Sheets

INTERCONNECTED PROCESSING NODES CONFIGURABLE AS AT LEAST ONE NON-UNIFORM MEMORY ACCESS (NUMA) DATA PROCESSING SYSTEM

BACKGROUND OF THE INVENTION

1. Technical Field

The present invention relates in general to data processing and, in particular, to a non-uniform memory access (NUMA) data processing system. Still more particularly, the present invention relates to a collection of interconnected processing nodes that may be configured as one or more data processing systems including at least one NUMA data processing system.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of an SMP s computer system can generally be expected to improve with scale (i.e., with the addition of more processors), inherent bus, memory, and input/output (I/O) bandwidth limitations prevent significant advantage from being obtained from scaling a SMP beyond an implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs may be impractical for use in smaller systems from a cost standpoint.

As a result, there has recently been increased interest in an MP computer system topology known as non-uniform memory access (NUMA), which addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller uniprocessor or SMP system. Thus, the shared components within each node can be optimized for use by one or a few processors, while the overall system benefits from the availability of larger scale parallelism while maintaining relatively low latency.

The present invention recognizes that the expense of a large-scale NUMA data processing system is difficult to justify in certain computing environments, such as those having varying workloads. That is, some computing environments infrequently require the processing resources of a large-scale NUMA data processing system to execute a single application and frequently require multiple smaller data processing systems to run different operating systems and/or different applications. Prior to the present invention, the varying workloads of such computing environments could be accommodated only by multiple computer systems of differing scale or by physically reconfiguring a NUMA system by connecting and disconnecting nodes as needed.

SUMMARY OF THE INVENTION

To address the above-described shortcomings in the art, the present invention provides a data processing system including a plurality of processing nodes that each contain at least one processor and data storage. The plurality of processing nodes are coupled together by a system interconnect. The data processing system further includes a configuration utility residing in data storage within at least one of the plurality of processing nodes. The configuration utility selectively configures the plurality of processing nodes into either a single non-uniform memory access (NUMA) system or into multiple independent data processing systems through communication via the system interconnect.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
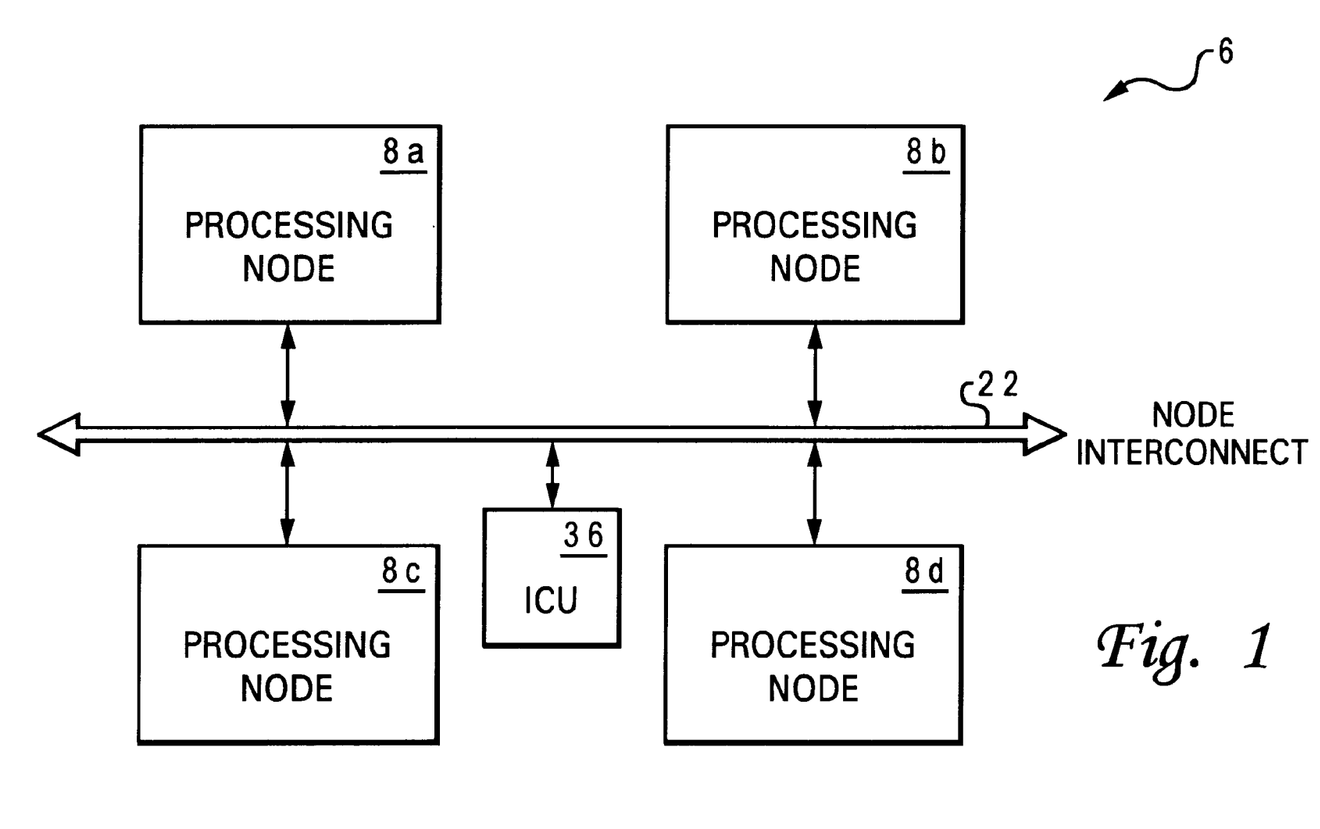
FIG. 1 depicts an illustrative embodiment of a multiple-node data processing system with which the present invention may advantageously be utilized.

With reference now to the figures and in particular with reference to FIG. 1, there is depicted an illustrative embodiment of a data processing system in accordance with the present invention. The depicted embodiment can be realized, for example, as a workstation, server, or mainframe computer. As illustrated, data processing system 6 includes a number of processing nodes 8 (in this case four), which are interconnected by a node interconnect 22. As discussed further below, inter-node data coherence is maintained by an interconnect coherence unit (ICU) 36.

Figure 2:
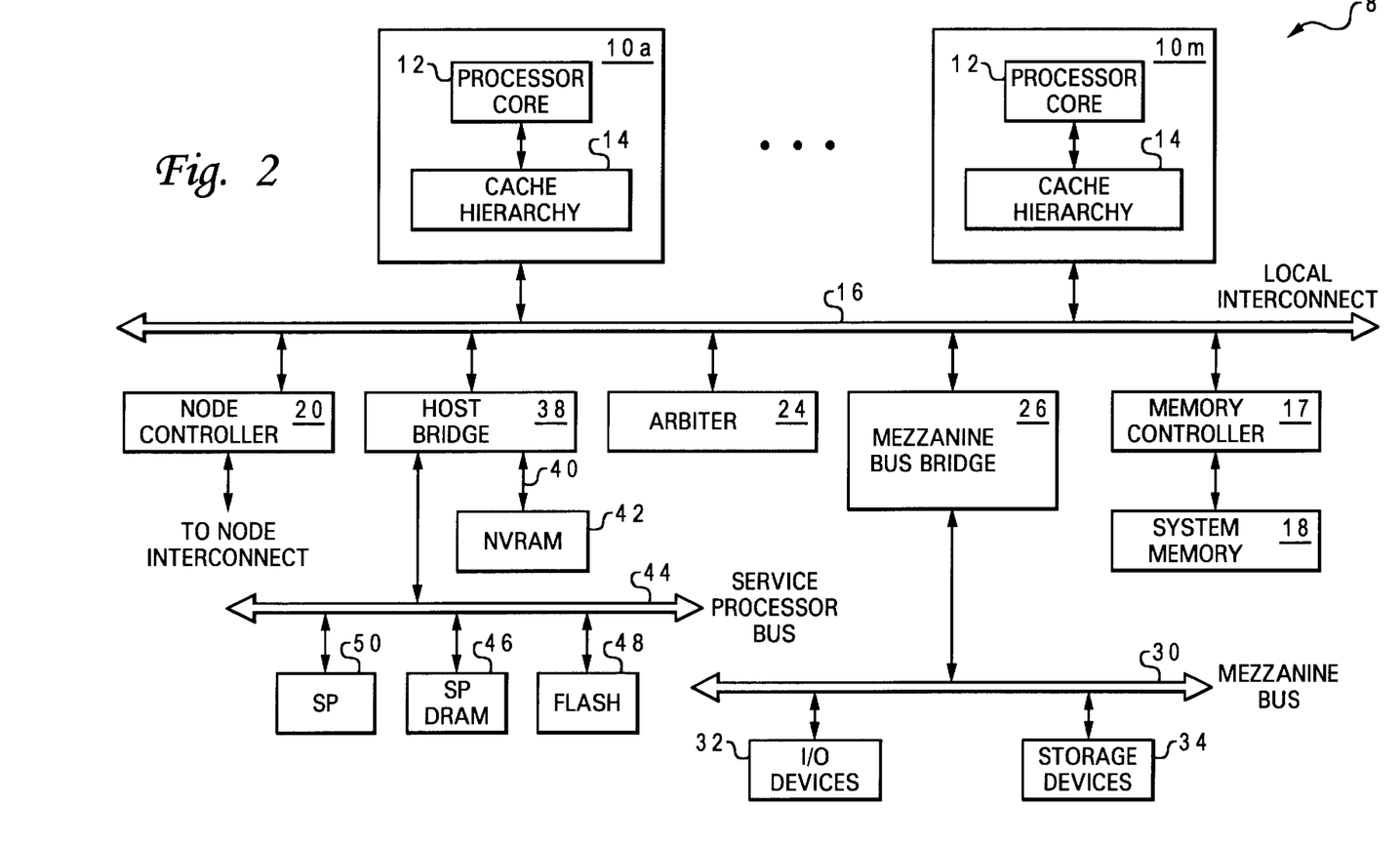
FIG. 2 is a more detailed block diagram of a processing node within the data processing system shown in FIG. 1.

Referring now to FIG. 2, processing nodes 8a–8d may each include one or more processors 10a–10m, a local interconnect 16, and a system memory 18 that is accessed via a memory controller 17. Processors 10a–10m are preferably (but not necessarily) identical. In addition to the registers, instruction sequencing logic and execution units utilized to execute program instructions, which are generally designated as processor core 12, each of processors 10a–10m also includes an on-chip cache hierarchy 14 that is utilized to stage data to the associated processor core 12 from system memories 18. Each cache hierarchy 14 may include, for example, a level one (L1) cache and a level two (L2) cache having storage capacities of between 8–32 kilobytes (kB) and 1–16 megabytes (MB), respectively.

Each of processing nodes 8a–8d further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions to remote processing nodes 8. Second, each node controller 20 snoops communication transactions on node interconnect 22 and masters relevant communication transactions (e.g., read requests) on the associated local interconnect 16. Communication on each local interconnect 16 is controlled by an arbiter 24. Arbiter 24 regulates access to local interconnect 16 based on bus request signals generated by processors 10 and compiles coherency responses for snooped communication transactions on local interconnect 16.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard., a graphical pointer, and serial and parallel ports for connection to external networks or attached devices. Storage devices 34, on the other hand, may include optical or magnetic disks that provide non-volatile storage for operating system and application software.

Local interconnect 16 is further coupled via host bridge 38 to a memory bus 40 and a service processor bus 44. Memory bus 40 is coupled to non-volatile random access memory (NVRAM) 42, which stores configuration and other critical data of processing node 8. Service processor bus 44 supports a service processor 50, which serves as the boot processor for processing node 8. Boot code for processing node 8, which typically includes Power-On Self-Test (POST), Basic Input/Output System (BIOS), and operating system loader code, is stored in flash memory 48. Following boot, service processor 50 serves as a system monitor for the software and hardware of processing node 8 by executing system monitoring software out of service processor dynamic random access memory (SP DRAM) 46.

System Configurability

In a preferred embodiment of the present invention, the BIOS boot code stored in flash memory 48 includes a configuration utility that permits data processing system 6 to be selectively partitioned into one or more independently operable subsystems. As discussed in detail below, data processing system 6 may advantageously be configured by the configuration software as a single NUMA data processing system, as multiple NUMA data processing subsystems, or any other combination of single and/or multi-node (i.e., NUMA) data processing subsystems in response to the anticipated characteristics of the processing load. For example, if a large amount of processing power is required to execute a single application, it is desirable to configure data processing system 6 as a single NUMA computer system, thus maximizing the processing power available to execute the application. If, on the other hand, execution of multiple diverse applications and/or multiple diverse operating systems is required, it may be desirable to configure data processing system 6 as multiple NUMA data processing subsystems and/or multiple single node subsystems.

When data processing system 6 is configured as multiple data processing subsystems, the data processing subsystems contain disjoint and possibly differently-sized sets of processing nodes 8. Each of the multiple data processing subsystems can be independently configured, run, shut down, rebooted, and re-partitioned without interfering with the operation of the other data processing subsystems. Importantly, reconfiguration of data processing system 6 does not require the attachment. or detachment of any processing nodes 8 to or from node interconnect 22.

Memory Coherency

Because data stored within a system memory 18 can be requested, accessed, and modified by any processor 10 within a given data processing subsystem, a cache coherence protocol is implemented to maintain coherence both between caches in the same processing node and between caches in different processing nodes of the same data processing subsystem. The cache coherence protocol that is implemented is implementation-dependent; however, in a preferred embodiment, cache hierarchies 14 and arbiters 24 implement the conventional Modified, Exclusive, Shared, Invalid (MESI) protocol, or a variant thereof. Inter-node cache coherency is preferably maintained through a directory-based mechanism centralized in interconnect coherence unit (ICU) 36 connected to node interconnect 22, but could alternatively be distributed within directories maintained by node controllers 20. This directory-based coherence mechanism preferably recognizes the M, S and I states and considers the E state to be merged into the M state for correctness. That is, data held exclusively by a remote cache is assumed to be modified, whether or not the data has actually been modified.

Interconnect Architecture

Local interconnects 16 and node interconnect 22 can each be implemented with a variety of interconnect architectures. However, in a preferred embodiment, at least node interconnect 22 is implemented as a switch-based interconnect governed by the 6xx communication protocol developed by IBM Corporation of Armonk, N.Y. This point-to-point communication methodology permits node interconnect 22 to route address and data packets from a source processing node 8 to only the processing nodes 8 within the same data processing subsystem.

Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Configuration Utility

Figure 3A:
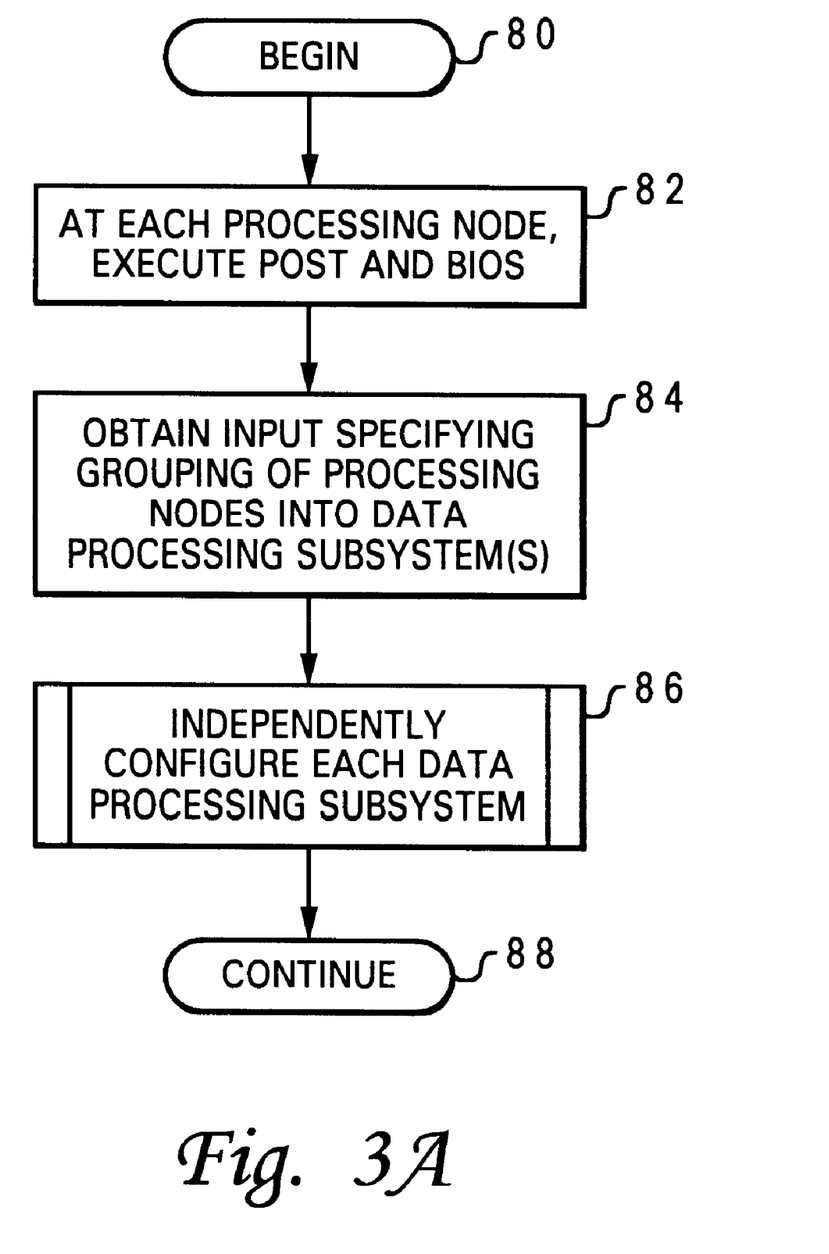
FIG. 3A is a high level logical flowchart illustrating a method of selectively partitioning and configuring the data processing system of FIG. 1 into one or more data processing subsystems.

Referring now to FIG. 3A there is depicted a high level logical flowchart illustrating a process for partitioning and configuring a multi-node data processing system such as data processing system 6 into one or more data processing subsystems in accordance with the present invention. As illustrated, the process begins at block 80 in response to all of processing nodes 8a–8d being powered on and then proceeds to block 82, which illustrates service processor 50 at each processing node 8 executing POST code from flash memory 48 to initialize the local hardware to a known, stable state. Following POST, each service processor 50 executes conventional BIOS routines to interface key peripherals (e.g., a keyboard and display) and initialize interrupt handling. Then, as illustrated beginning with block 84, a processor (i.e., service processor 50 and/or a processor 10) at each processing node 8 begins execution of the BIOS configuration utility mentioned above by obtaining input specifying a number of independent data processing subsystems into which data processing system 6 is to be partitioned and the particular processing nodes 8 belonging to each data processing subsystem. The input illustrated at block 84 can be obtained from any of a number of sources, for example, a file residing on a data storage medium or operator input at one or more processing nodes 8.

In a preferred embodiment of the present invention, the input illustrated at block 84 is obtained from an operator at one or more processing nodes 8 in response to a series of menu screens displayed at such processing nodes 8. The input is then utilized to construct a partitioning mask at each processing node 8 indicative of any other processing nodes 8 with which the processing node 8 is grouped to form a data processing subsystem. For example, if each of the four processing nodes 8 within data processing system 6 is assigned a bit in a four-bit mask, a NUMA configuration including all processing nodes can be represented by 1111, two 2-node NUMA subsystems can be represented by 0011 and 1100 or 1010 and 0101, and a 2-node NUMA subsystem and two single node subsystems can be represented by 0011, 1000 and 0100 (and other similar node combinations). If input indicating a desired partitioning of data processing system 6 is provided at less than all of processing nodes 8, the appropriate mask is transmitted to the other processing nodes 8 via node interconnect 22. In this manner, each processing node 8 has a record of each other processing node 8, if any, with which it is to be grouped.

Following block 84, the process proceeds to block 86, which depicts each data processing subsystem of data processing system 6 independently completing its configuration, as discussed below in detail with reference to FIGS. 3B and 3C. Processing then continues at block 88.

Figure 3B:
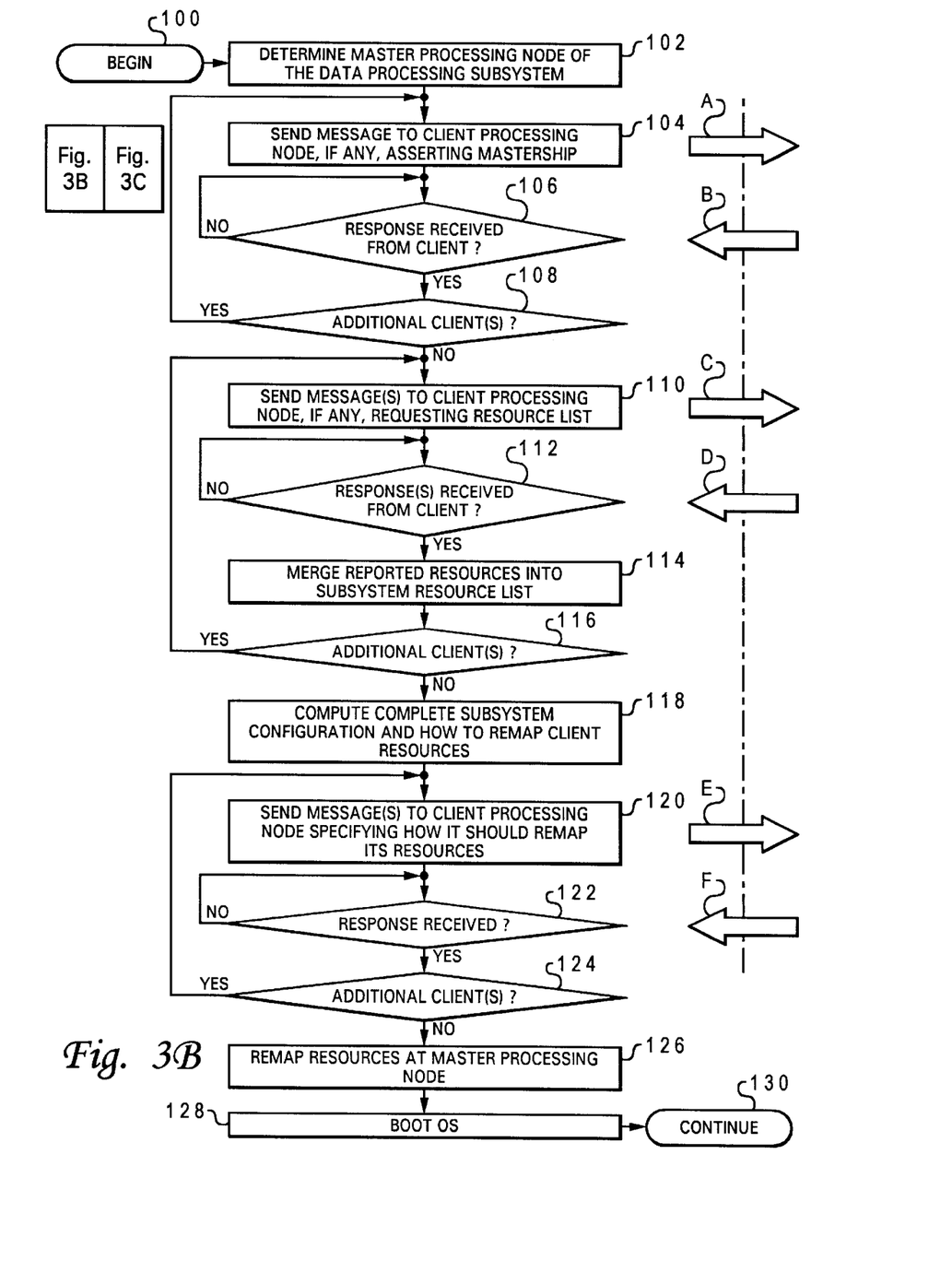
FIG. 3B is a high level logical flowchart of a method by which a master processing node configures a data processing subsystem in accordance with an embodiment of the present invention.
Figure 3C:
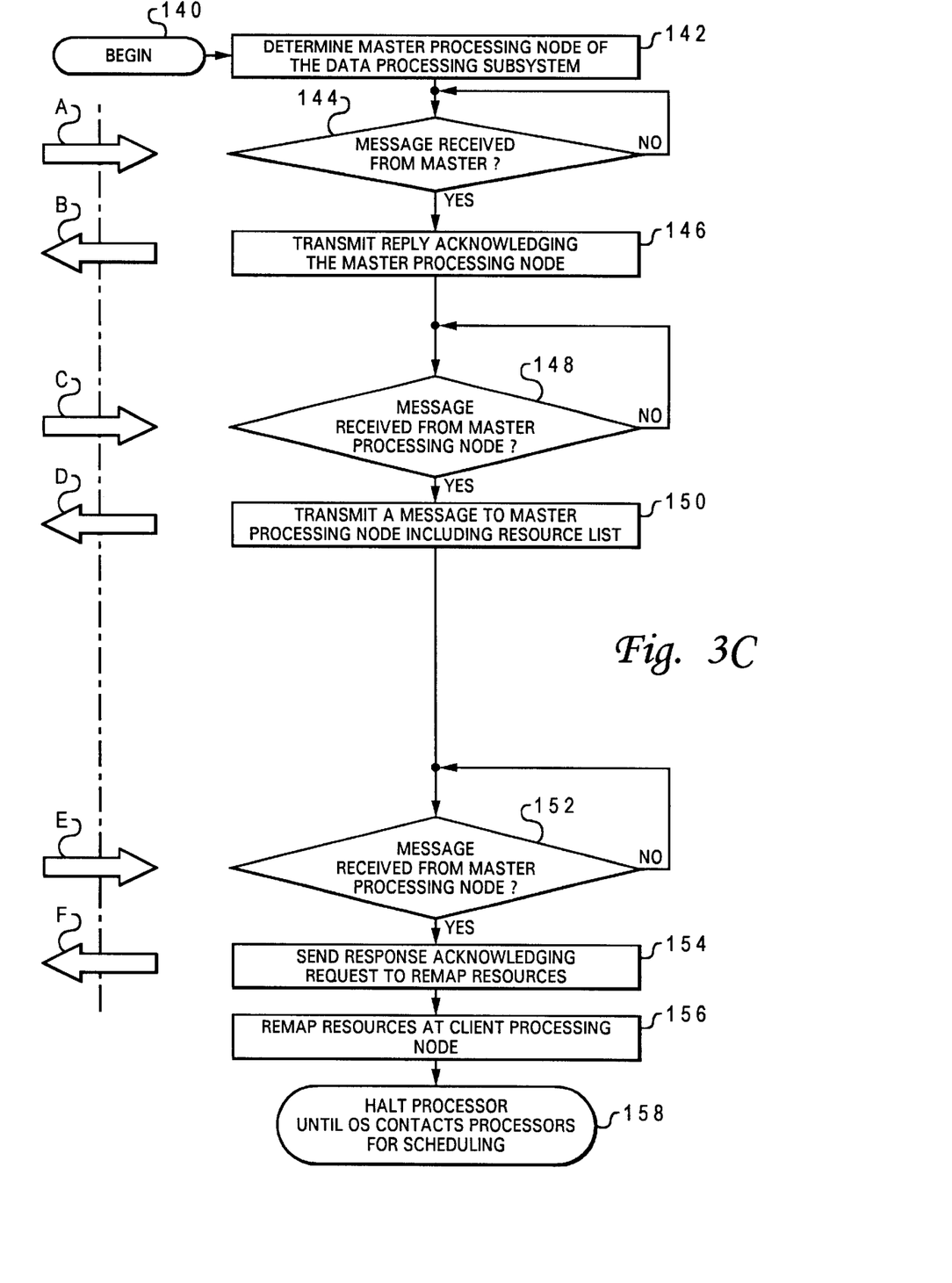
FIG. 3C is a high level logical flowchart of a method by which a client processing node is configured in accordance with an embodiment of the present invention.

Referring now to FIGS. 3B and 3C, high level logical flowcharts are given that respectively illustrate processes by which master and client processing nodes can establish the configuration of a data processing subsystem of data processing system 6 as depicted at block 86 of FIG. 3A. The illustrated processes, which are described together to detail the communication therebetween, are preferably implemented as a portion of the BIOS configuration utility discussed above.

The process depicted in FIG. 3B, which represents the operations of a master processing node 8, and the process depicted in FIG. 3C, which represents the operations of a client processing node 8 (if any), begin in parallel at blocks 100 and 140, respectively, following block 84 of FIG. 3A. As shown at blocks 102 and 142, respectively, each processing node 8 in the data processing subsystem determines whether it is the master processing node 8 responsible for completing the configuration of the data processing subsystem. The master processing node 8 of a data processing subsystem can be determined by a number of well-known mechanisms, including voting and race, but in a preferred embodiment the master processing node 8 is set by default as the processing node 8 in the data processing subsystem having the lowest-order bit among those set in the partitioning mask. A master processor (i.e., either service processor 50 or a designated processor 10) in the processing node 8 determined to be the master then manages the configuration of its data processing subsystem as detailed in blocks 104–130 of FIG. 3B.

Referring now to block 104, the master processor issues a message on its local interconnect 16 targeting a client processing node 8, if any, belonging to the data processing subsystem. The message, represented by arrow A, asserts that its processing node 8 is the master. The message is snooped by the local node controller 20 and forwarded to the indicated client processing node 8 via node interconnect 22. As shown at 30 blocks 144 and 146, respectively, the client processing node 8 waits until this message is received from the master, and in response to receipt of the message, transmits an acknowledgement message, represented by arrow B, to the master processing node 8. As depicted at blocks 106 and 108 of FIG. 3B, the master waits until the acknowledgement message is received from the client processing node 8, and once the acknowledgement has been received, returns to block 104 if the partitioning mask indicates that an additional client processing node 8 has not yet been contacted with the master assertion message. This master assertion-acknowledgement protocol (which could alternatively be performed with multiple client processing nodes 8 in parallel) serves hot only to guarantee that all processing nodes 8 within a data processing subsystem are in agreement as to which processing node 8 is the master, but also advantageously synchronizes the various processing nodes 8 in a subsystem, which may have been powered on at different times and which may boot at different rates.

Once master processing node 8 has received acknowledgements of its mastership from all of the client processing nodes 8 (if any) in its data processing subsystem, as indicated by the process in FIG. 3B proceeding from block 108 to block 110, the master processing node 8 requests configuration information (e.g., a resource list) from a client processing node 8 (if any). This request for configuration information, which may include one or more messages to a client, is represented by arrow C. As illustrated at blocks 148 and 150 of FIG. 3C, the client processing node 8 awaits the resource list request, and in response to receipt of the resource list request, responds by transmitting master processing node 8 one or more messages specifying its I/O resources, the amount of system memory 18 present, the number of processors 10 it contains, and other configuration information. This configuration information response is represented by arrow D. Blocks 112 and 114 of FIG. 3B illustrate the master processing node 8 awaiting the response from the client processing node 8, and following receipt of the response, adding the specified resources to a subsystem resource list. As shown at block 116, master processing node 8 performs blocks 110–114 for each client processing node 8 specified in the partitioning mask.

Once a resource list has been obtained by the master from each client (if any), as indicated by the process in FIG. 3B proceeding from block 116 to block 118, the master processor at the master processing node 8 determines an overall configuration of the subsystem and computes how to remap the resources of each client processing node 8. Next, at block 120, the master processor at the master processing node 8 transmits to a client processing node 8 (if any) one or more messages (represented by arrow E) specifying how that client processing node 8 should remap its resources. For example, the master processor may specify to the memory controller 17 of the client processing node 8 the range of physical addresses with which the storage locations in the attached system memory 18 are associated. In addition, the master processor may specify the memory-mapped addresses of I/O devices 32 in client processing node 8. Depending upon the implementation, the master processor can also specify the processor ID for each processor 10 in the client processing node 8.

In a preferred embodiment, all of processors 10 in each data processing subsystem share a single physical memory space, meaning that each physical address is associated with only a single location in one of system memories 18. Thus, the overall contents of a data processing subsystem's system memory, which can generally be accessed by any processor 10 in the data processing subsystem, can be viewed as partitioned between system memories 18 within the processing nodes 8 comprising the data processing subsystem. For example, in an illustrative embodiment in which each processing node 8 includes, 1 GB of system memory 18 and data processing system 6 is configured as two NUMA data processing subsystems, each NUMA data processing subsystem would have a 2 gigabyte (GB) physical address space.

As shown at blocks 152 and 154 of FIG. 3C, the client processing node 8 awaits the remap request from the master processing node 8, and in response to receipt of the remap request, responds with an acknowledgement of the remap request, represented by arrow F. As illustrated at blocks 122–124, the master processing node 8 awaits this remap-request acknowledgement, and in response to receipt of the remap request acknowledgement, repeats blocks 120–122 for each other client processing node 8 indicated in the partitioning mask.

Following block 124 of FIG. 3B and block 154 of FIG. 3C, the master processing node 8 and each client processing node 8 remaps its respective local resources in accordance with the configuration determined by the master processing node 8, as depicted at blocks 126 and 156. As indicated at block 158 of FIG. 3C, each client processing node 8 then halts processing by processors 10 until the operating system (OS) of the data processing subsystem schedules work to processors 10. Meanwhile, as shown at block 128 of FIG. 3B, master processing node 8 boots the operating system for its data processing subsystem from one of storage devices 34, for example. As mentioned above, if multiple data processing subsystems are formed from the processing nodes 8 of data processing system 6, the multiple data processing subsystems may run different operating systems, such as Windows NT and SCO (Santa Cruz Operation). UNIX. Thereafter, processing by the master processing node 8 continues at block 130.

As has been described, the present invention provides a method for configuring a collection of interconnected processing nodes into either a single NUMA data processing system or into a selected number of independently operable data processing subsystems. In accordance with the present invention, the partitioning of the processing nodes into multiple data processing subsystems is accomplished without connecting or disconnecting any of the processing nodes.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the method of the present invention, it should be understood that the present invention may alternatively be implemented as a computer program product for use with a computer system. Programs defining the functions of the present invention can be delivered to a computer system via a variety of signal-bearing media, which include, without limitation, non-rewritable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the method functions of the present invention, represent alternative embodiments of the present invention.

What is claimed is:

1. A data processing system, comprising:
    a system interconnect;
    a plurality of processing nodes coupled to said system interconnect, each of said plurality of processing nodes containing at least one processor and data storage; and
    boot code residing in a system memory in at least one of said plurality of processing nodes, wherein said boot code includes a configuration utility that, upon system reset, selectively configures said plurality of processing nodes into one of a single non-uniform memory access (NUMA) system and multiple independent data processing systems through communication via said system interconnect, and wherein said boot code boots an independent operating system in each configured data processing system, such that said boot code boots multiple independent operating systems when said configuration utility configures said plurality of processing nodes as a plurality of data processing systems.

2. The data processing system of claim 1, wherein at least one of said multiple independent data processing systems is a non-uniform memory access (NUMA) system including at least two of said plurality of processing nodes.

3. The data processing system of claim 1, wherein said multiple independent data processing systems contain disjoint subsets of said plurality of processing nodes.

4. The data processing system of claim 1, wherein said multiple independent operating systems comprises at least two diverse operating systems.

5. The data processing system of claim 1, wherein said communication includes a request for configuration information transmitted from a master processing node among said plurality of processing nodes to at least one other of said plurality of processing nodes.

6. The data processing system of claim 5, said communication includes a reply message transmitted from said at least one other of said plurality of processing nodes to said master processing node, wherein said reply message contains requested configuration information.

7. A method of configuring a plurality of interconnected processing nodes into one or more data processing systems, said method comprising:

coupling a plurality of processing nodes with a system interconnect, wherein each of said plurality of processing nodes contains at least one processor and data storage;

in response to system reset, transmitting at least one configuration message over said system interconnect;

utilizing said at least one configuration message, configuring said plurality of processing nodes coupled to said system interconnect into one of a single non-uniform memory access (NUMA) system and multiple independent data processing systems; and booting an independent operating system in each configured data processing system, such that multiple independent operating systems are booted when said plurality of processing nodes are configured as a plurality of data processing systems.

8. The method of claim 7, wherein configuring said plurality of processing nodes into multiple independent data processing systems comprises configuring said plurality of processing nodes into at least one non-uniform memory access (NUMA) subsystem including at least two of said plurality of processing nodes.

9. The method of claim 7, wherein configuring said plurality of processing nodes into multiple independent data processing systems comprises configuring said plurality of processing nodes into multiple independent data processing systems containing disjoint subsets of said plurality of processing nodes.

10. The method of claim 7, and further comprising:

storing in data storage in at least one of said plurality of processing nodes a configuration utility forming a portion of boot code; and executing said configuration utility to configure said plurality of processing nodes.

11. The method of claim 7, wherein transmitting at least one configuration message comprises transmitting a request for configuration information from a master processing node among said plurality of processing nodes to at least one other of said plurality of processing nodes.

12. The method of claim 11, wherein transmitting at least one configuration message further comprises transmitting a reply message from said at least one other of said plurality of processing nodes to said master processing node, wherein said reply message contains requested configuration information.

13. A program product for configuring a data processing system including a system interconnect having a plurality of processing nodes coupled thereto, said plurality each including at least one processor and data storage, said program product comprising:

a data processing system usable medium; and boot code encoded in said data processing system usable medium, wherein said boot code includes a configuration utility that, upon system reset, selectively configures said plurality of processing nodes into one of a single non-uniform memory access (NUMA) system and multiple independent data processing systems through communication via said system interconnect, and wherein said boot code boots an independent operating system in each configured data processing system such that said boot code boots multiple independent operating systems when said configuration utility configures said plurality of processing nodes as a plurality of data processing systems.

14. The program product of claim 13, wherein at least one of said multiple independent data processing systems is a non-uniform memory access (NUMA) system including at least two of said plurality of processing nodes.

15. The program product of claim 13, wherein said multiple independent data processing systems contain disjoint subsets of said plurality of processing nodes.

16. The program product of claim 13, wherein said multiple independent operating systems comprises at least two diverse operating systems.

17. The program product of claim 13, wherein said communication includes a request for configuration information transmitted from a master processing node among said plurality of processing nodes to at least one other of said plurality of processing nodes.

18. The program product of claim 17, said communication including a reply message transmitted from said at least one other of said plurality of processing nodes to said master processing node, wherein said reply message contains requested configuration information.

19. The method of claim 7, wherein booting multiple independent operating systems comprises booting at least two diverse operating systems.

* * * * *